Oct. 2, 1928.

L. S. ROTHENBERG 1,686,105

AMUSEMENT AND EDUCATIONAL DEVICE

Filed Jan. 31, 1928

Louis S. Rothenberg, Inventor

By *Charles H. Lorett*

Attorney

Patented Oct. 2, 1928.

1,686,105

UNITED STATES PATENT OFFICE.

LOUIS S. ROTHENBERG, OF BROOKLINE, MASSACHUSETTS.

AMUSEMENT AND EDUCATIONAL DEVICE.

Application filed January 31, 1928. Serial No. 250,747.

Figure 1:
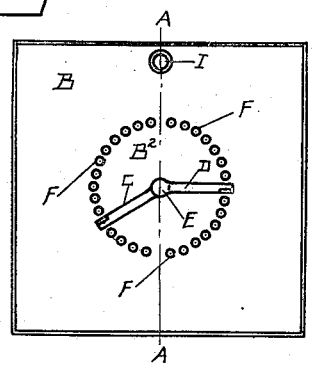
Figure 2:
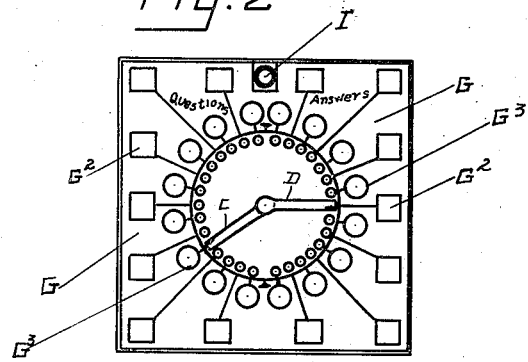
Figure 3:
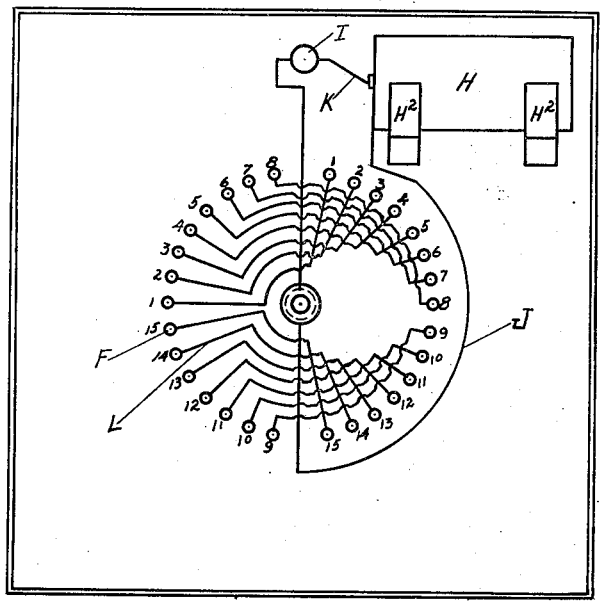
Figure 4:
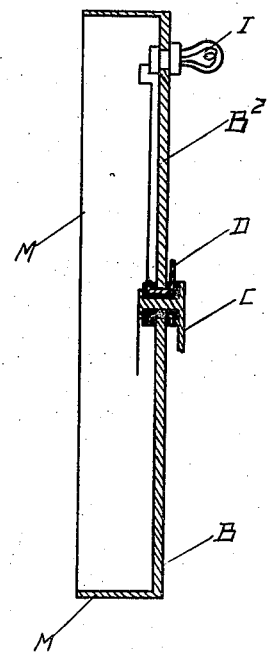

This invention relates to amusement and educational devices. It has for its purposes to provide an interesting, amusing, and educational means of holding the attention of one or more persons while being operated; to provide a novel means for producing a signal when the answer to a given question is indicated; to provide a device comprising a board wired with conductors and contacts adaptable for use and operated with a battery and rotably mounted arms, said conductors leading to a signal such as a lamp, or the signal may be audible; to provide novel means whereby in operation a signal will result designating a desired answer; to provide a device of the character indicated in which a single disk carrying question and answer forms are interchanged with other disks likewise carrying varied, advance and progressive question and answer data, so that persons of all ages may be entertained and instructed; to provide a device of the character indicated of simplified construction, smaller, simpler and less expensive to manufacture than heretofore known, positive in action, efficient and durable in service; and to provide the various other advantages and results made evident from the following specification:

I accomplish the objects of my invention as shown in the accompanying drawings which form a part of this specification and in which Figure 1 shows a plan view of the operating board of my device. Figure 2 shows a top view of my device with the question and answer disk in position thereon, ready for operation. Figure 3 shows the underside of the operating board shown in Figure 1. Figure 4 is a sectional view on the line $a-a$ in Figure 1 showing the device properly boxed for protection and convenience in use.

Referring again to Figure 1, B shows the operating board, $B^2$ shows the dial section of the operating board, C and D show the rotable arms mounted at E so as to allow contact at their free ends with any of the terminal contacts F which are positioned about the dial. Referring again to Figure 2, G shows the question and answer disk, the questions being placed preferably on the left side of the disk in the spaces $G^2$ and $G^3$, and the answers preferably in the spaces $G^2$ and $G^3$ on the right side of the disk but this arrangement is of course optional. Referring again to Figure 3, H shows the source of energy, preferably an ordinary dry cell such as is normally used in the commercially known flash light, the cell being held in place by the clamps $H^2$, I shows the indicator or signalling means preferably a small electric bulb or buzzer. J shows the circuit wire leading from one of the battery connections to the arm D. K shows the circuit wire leading from the other battery connection to the indicator I and thence to the arm C. Referring again to Figure 3 it will be noted that the terminal posts F are designated for convenience in wiring by numbers printed on the under side of the board, the post on the left side being numbered to correspond with post having the same number on the right side of the board. The posts with corresponding numbers are then connected by the wires L running from the left side to the right side of the board, and any given question and the answer thereto are placed on the disk when in position on the board so that the respective question and answers are opposite terminals of the same number, the questions on the left side of the board and the answers on the right side. Referring again to Figure 4, M shows the box in which the device is contained.

Similar letters of reference refer to similar parts throughout the various views.

In operation the arm C is turned to contact with the question terminal opposite any desired question on the left side of disk. To ascertain the answer the arm D is then moved over the answer terminals on the right side of the board until it contacts with the terminal of the number corresponding with the number of the last mentioned question terminal, whereupon the circuit is completed and the indicator signals that the correct answer is had opposite the terminal contacting with the arm D. The arms C and D are interchangeable and may be used in reverse order if desired.

While I have illustrated and described a preferred construction for carrying my invention into effect, this is capable of variation or modification without departing from the spirit of the invention. I therefore do not wish to be limited to the exact details of construction herein set forth but desire to avail myself of such variations and modifications as come within the scope of the appended claims.

Having thus described my invention, I claim as new and desire to secure by Letters Patent of the United States of America:

1. An educational device of the type described, comprising a base, a dial on the base having indicia thereon, a pair of pointers rotatably mounted on the base and insulated from each other, a source of electrical energy to one of the respective poles of which each pointer is connected, an alarm in the circuit of one pointer, and a plurality of contacts associated with the indicia on the dial and arranged in the paths of movement of the pointers, pairs of said contacts being connected in circuit so that when the pointers are in contact with any one of the pairs the circuit will be completed to the alarm.

2. An educational device of the type described, comprising a base, a dial on the base having indicia thereon, a pair of pointers having a common axis of rotation on the base and insulated from each other, a battery to one of the poles of which each pointer is connected, an alarm in the circuit of one pointer, a plurality of contacts associated with the several indicia on the dial and circularly arranged in the path of movement of the pointers, pairs of said contacts being connected in circuit so that when the pointers are in contact with any one of the pairs the circuit will be completed to the alarm, and the individual contacts of each pair of contacts being located apart from each other and in relatively different sectors of the dial.

3. An educational device of the type described, comprising a base having a top and edge supporting flanges carrying the top, a dial on the base having indicia thereon, a pair of pointers having a common axis of rotation on the base and insulated from each other, a battery to one of the poles of which each pointer is connected, clips for removably attaching the battery to the base beneath the top thereof, an alarm in the battery circuit of one pointer, and a plurality of contacts associated with the several indicia on the dial and circularly arranged in the path of movement of the pointers, certain pairs of the contacts being connected in circuit so that when the pointers are in contacts with any one of the pairs the circuit will be completed to the alarm.

In testimony whereof I affix my signature.

LOUIS S. ROTHENBERG